United States Patent [19]

Laulhe et al.

[11] Patent Number: 4,593,916
[45] Date of Patent: Jun. 10, 1986

[54] SEALING DEVICE PROVIDING THE UPSTREAM/DOWNSTREAM SEALING OF A VALVE

[75] Inventors: René Laulhe, Oloron Sainte Marie; Jean-Claude Garrigues, Ogeu les Bains, both of France

[73] Assignee: Applications Mecaniques et Robinetterie Industrielle (A.M.R.I.), Bagnolet, France

[21] Appl. No.: 741,256

[22] Filed: Jun. 27, 1985

[30] Foreign Application Priority Data

Jun. 28, 1984 [FR] France ................................ 84 10262

[51] Int. Cl.$^4$ .......................... F16J 15/12; F16K 5/14; F16K 5/00
[52] U.S. Cl. ...................................... 277/12; 277/151; 277/206 R; 251/306; 251/314
[58] Field of Search .................... 277/12, 32, 151, 165, 277/206 R; 251/306, 307, 314–317

[56] References Cited

U.S. PATENT DOCUMENTS

| | | | |
|---|---|---|---|
| 3,233,862 | 2/1966 | Marsh | 251/315 X |
| 4,005,848 | 2/1975 | Eggleston | 251/317 X |
| 4,006,883 | 2/1977 | Hilsheimer | 251/314 X |
| 4,373,543 | 2/1983 | Brown et al. | 251/306 X |

FOREIGN PATENT DOCUMENTS

| | | | |
|---|---|---|---|
| 2054045 | 5/1972 | Fed. Rep. of Germany | 251/315 |
| 2444716 | 4/1976 | Fed. Rep. of Germany | 251/315 |
| 106085 | 4/1965 | Norway | 251/317 |
| 1199656 | 7/1970 | United Kingdom | 251/315 |

*Primary Examiner*—Robert S. Ward
*Attorney, Agent, or Firm*—Scully, Scott, Murphy & Presser

[57] ABSTRACT

A sealing device for providing the upstream/downstream sealing of a valve comprising a valving member movable inside the bore of a tubular body and comprising at its periphery a sealing surface coming to bear on a sealing packing mounted in the body at the end of the valving stroke. This sealing packing comprises a dynamic annular sealing element and a coronal metal membrane, whose outer edge portion has flat radial part applied axially against a steep side of a shoulder in the bore of the body, for providing static sealing therewith.

15 Claims, 7 Drawing Figures

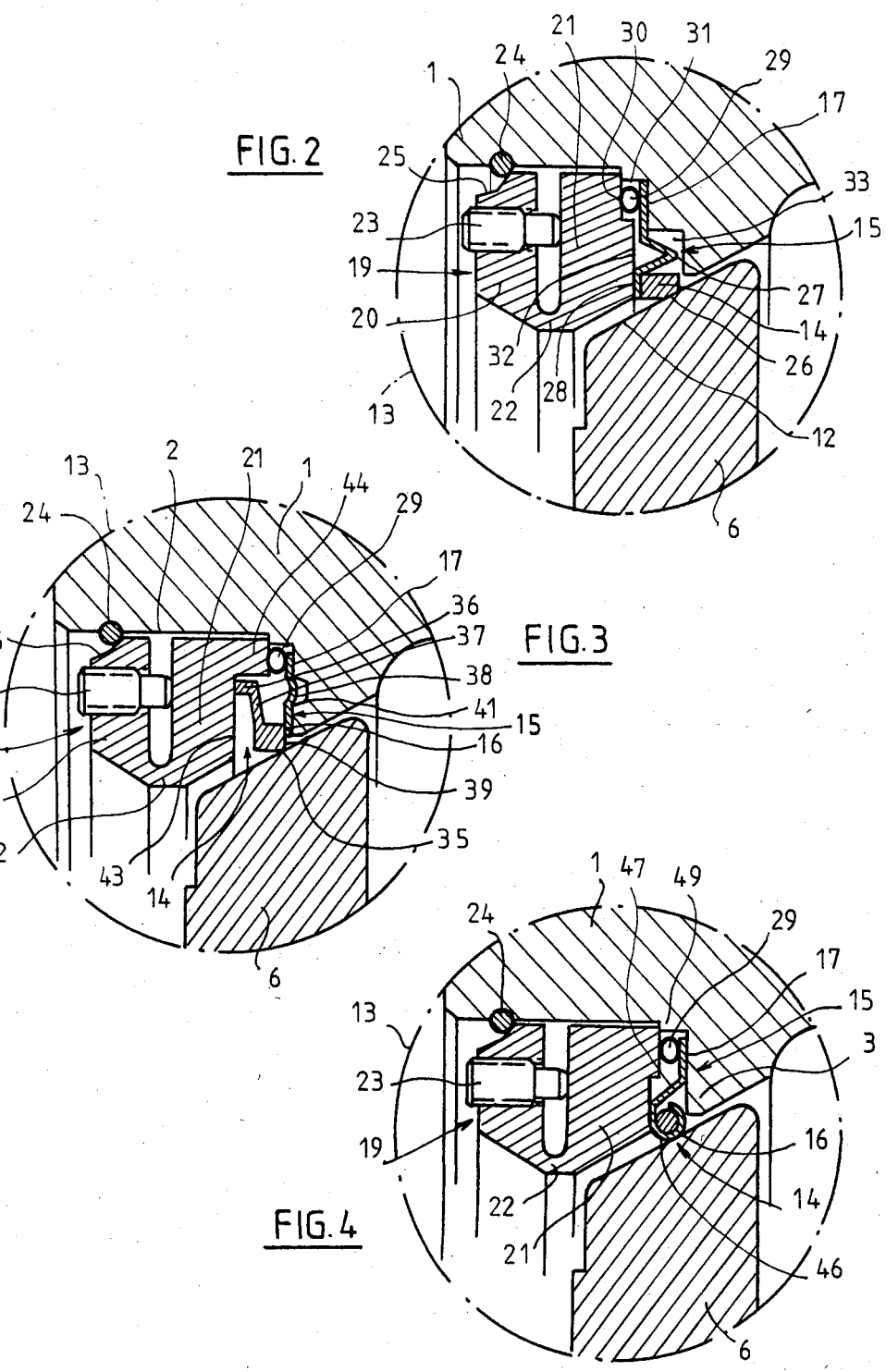

SEALING DEVICE PROVIDING THE UPSTREAM/DOWNSTREAM SEALING OF A VALVE

BACKGROUND OF THE INVENTION

1. Field of the Invention

The present invention relates to a sealing device intended more especially for providing the upstream/downstream sealing of a valve.

It applies more particularly to valves of the type comprising a valving member movable inside a tubular body and comprising, at its periphery, a sealing surface coming to bear, at the end of the valving stroke, on a circular sealing packing, after a movement tangent or parallel to the main axis of symmetry of said sealing packing.

The invention is also suitable for valves in which, in a reverse installation, the bore of the body comprises a substantially conical sealing surface and the valving member has at its periphery a packing providing static sealing with the valving member and dynamic sealing with said sealing surface.

Thus, in these types of valves, the sealing packing must fulfil multiple functions. It must at one and the same time provide static sealing, dynamic sealing and continuity of sealing between the static seal and the dynamic seal.

These sealing functions are particularly delicate to provide, more particularly in the case where, because of the operating conditions of the valve, the sealing packing must be made at one and the same time from a soft material capable of adapting itself to the surface state of the bearing surface of the seat so as to provide the best sealing, from a hard and rigid material capable of withstanding the mechanical forces due to the packing/seat contact pressure and to the pressure of the fluid to be sealed and sufficiently flexible for allowing relative sealing member/body movements without adversely affecting the sealing.

In fact, in the case where, in the closed position of the valve, the sealing surface of the valving member is not exactly centered on the dynamic liquid tight bearing surface of the packing, this latter is not uniformly compressed, so that an homogeneous seal is not obtained all around the valve. Thus, in the portions where the packing is highly compressed by the valving member, the valve may thus stand high pressures whereas, in the portions diametrically opposite these latter, the seal is doubtful and the risks of high pressure leaks are high.

2. Description of the Prior Art

To overcome these drawbacks, the valves have been fitted with mechanisms for centering the valving member with respect to the sealing packing, these mechanisms concerning either the kinematics of the valve or the valve itself.

However, these solutions are complex, unreliable and cause a considerable increase in the cost price of the valves.

It has also been proposed to provide the sealing packing in the form of a double flexible metal O-seal comprising:

a first flexible metal O-seal structure providing static sealing with the body of the valve, a second flexible metal O-seal structure providing the dynamic sealing, a radial membrane made from a resilient material connecting the two sealing structures together while enveloping them at least partially so as to provide continuity of sealing between the static seal and the dynamic seal, and to allow both self centering of the second seal structure on the sealing surface of the valving member, and a floating reaction ring, applied against the second seal structure opposite the zone of this structure where the sealing surface of the valving member comes to bear.

Such a sealing packing which is described in French Pat. No. 77 22976 of the 26th July 1977 in the name of the applicant for: "Double Flexible O-seal", allows excellent results to be obtained more especially in the case of valves or cocks intended to operate under conditions (high or low temperatures) for which the use of conventional elastomer packings is prohibited.

The object of the invention is more particularly to extend the self centering concept characteristic of the double flexible metal O-seal previously described to metal sealing structures having simplified structures, which may be more easily constructed and designed so as to simplify and considerably reduce the cost of fitting them in the body of the valve, not only in so far as the cost of the parts used is concerned and the machining operations required on the body but also the cost of the fitting operation properly speaking.

It should be noted that the invention is not limited solely to a simple sealing packing but to the whole of the arrangements used in combination with the structure and conformation of this sealing packing so as to obtain the desired results.

SUMMARY OF THE INVENTION

More precisely, the sealing device applies to a valve whose body comprises a central bore, having a bore shoulder with at least one steep side situated in a plane perpendicular to the axis of the bore and disposed substantially in line with the sealing surface of the valving member, when this latter is in the closed position.

This sealing device comprises more particularly:

a sealing packing comprising an annular dynamic sealing element with a very low modulus of elasticity to traction along its circumference, this annular dynamic sealing element having an inner diameter substantially equal to the mean diameter of the sealing surface of the valving member, and a metal ring-shaped membrane which comprises an inner edge connected sealingly to the annular dynamic sealing element, an outer edge having a flat radial part which is applied against the steep side of the bore shoulder of the body for providing static sealing therewith, and whose central part is shaped so as to provide radial elasticity between the outer and inner edges of the membrane and radial mobility of the annular sealing element allowing self centering thereof on the sealing surface of the valving member, and a clamping device such as a clamping flange mounted inside said bore and comprising means for axially clamping, in an homogeneous way, the flat part of the membrane so as to provide said static seal.

It should be noted that the annular element used in this sealing device must be designed so as to play both the role of the second sealing structure described in the French patent mentioned above and that of the reaction ring. Of course, the method of fixing same to the metal membrane depends on its nature and conformation.

Thus, in one embodiment of the invention, this annular element consists of a solid metal ring, having a section at least partially polygonal, coming directly to bear on the sealing surface of the valving member. In this case, the metal membrane may be directly welded to a face of the ring.

In the case where this solid metal ring has a partially circular section, the inner edge of the membrane may be adapted so as to envelope it, at least partially. In this case the dynamic seal is obtained by the contact of the membrane with the sealing surface of the valving member.

In another particularly advantageous embodiment of the invention, the inner edge of the membrane forms a bend defining an annular volume inside which is disposed an annular element formed at least partially by a ring made from a composite material for example resin reinforced with long fibers which may be carbon, glass, metal or "Kevlar" fibers. This solution has the advantage of allowing the relative radial indeformability of the annular element to be suitably adapted, either by an appropriate choice of the material forming the fibrous element depending on its tensile strength, or by an appropriate choice of the diameter of the fibers or else by the number of turns forming the winding.

BRIEF DESCRIPTION OF THE DRAWINGS

Some embodiments of the invention will be described hereafter by way of non limitative examples, with reference to the accompanying drawings in which:

FIGS. 2, 3 and 4 are axial sections on a larger scale of the detail of FIG. 1 for three respective variants of the sealing device of the invention, comprising a solid metal annular element.

DESCRIPTION OF THE PREFERRED EMBODIMENTS

Figure 1:
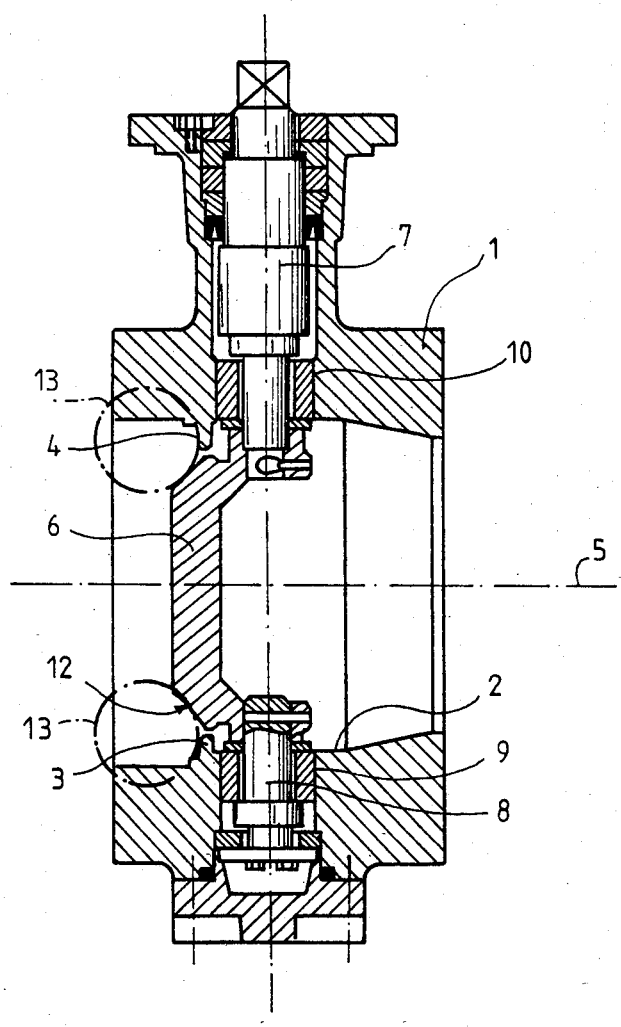
FIG. 1 is a schematical axial section of a butterfly valve which may be equipped with a sealing device according to the invention.

With reference to FIG. 1, the butterfly valve comprises in a conventional way:

on the one hand, a body 1 with a central, at least partially cylindrical bore 2 having a bore shoulder 3 which has a steep side 4 situated in a plane perpendicular to the axis 5 of the bore 2, and on the other hand, a butterfly 6 mounted for pivoting in body 1 by means of two respective shafts 7, 8 passing through transverse holes 9, 10 provided in the body and one of which (shaft 7) serves for driving the butterfly 6.

In this example, the sealing surface 12 of the butterfly 6 (which is formed by its edge) has a spherical shape centered on the main axis of symmetry of the butterfly 6.

Of course, the invention is not limited to this spherical shape. In fact, this shape could also be conical or, more generally, a conoid of revolution, that is to say formed by a curve of revolution whose generatrix is an appropriate curve.

It should be noted that in the closed position of the valve, the edge 12 of butterfly 6 is disposed substantially in line with the steep side 4 of the bore shoulder 3 of body 1.

In this Figure, the device used for providing the upstream/downstream sealing of the valve has not been shown. A circle 13 has been simply shown corresponding to the different details of construction shown in FIGS. 2 to 6.

As mentioned above, these sealing devices comprise a sealing packing formed from an annular dynamic sealing element 14 and a metal membrane 15 in the form of a ring secured by its inner edge 16 to the annular element 14 and whose outer edge has a flat radial part 17 intended to be clamped between the steep side 4 of the shoulder of the bore 3 in body 1 for providing the static seal.

It should be noted in this connection that in the embodiment shown in FIGS. 2, 3, 4 and 5, this clamping of the flat part 17 of the metal membrane 15 is provided by means of a circular collar 19 having a U shaped section with thick wings 20, 21 and a relatively thin web 22, and which has its concave side turned towards the wall of bore 2.

The wing 20 of this collar 19 situated on the side opposite the shoulder has passing therethrough from one side to the other a series of tapped holes parallel to the axis of the bore, in each of which is screwed a screw 23 whose end bears against the inner face of wing 21. The element to be clamped (the flat part 17 of membrane 15) is disposed in the cavity between the outer face of wing 21 and the steep face 4 of shoulder 3.

Furthermore, the wing 20 of collar 19 takes its bearing on a retainer 24 housed in a semi toric groove machined in the bore 2 of body 1. The surface of wing 20, on which the retainer 24 comes to bear, is tapered (chamfer 25) so that the retainer 24 is held in the groove by the radial component of the forces exerted by collar 19 on the retainer 24.

Thus, by screwing in the screws 23, collar 19 is deformed and opens slightly, the web 22 then playing the role of resilient hinge. Because wing 20 is axially retained by retainer 24, wing 21 pushed by screws 23 compresses the element to be clamped against the steep face 4 of the shoulder 3 in the bore of body 1, for example through a resilient O-seal 29.

In the example shown in FIG. 2, the sealing packing used comprises an annular sealing element 14 made from solid metal, having a substantially rectangular section whose angular region 26 coming into contact with the edge 12 of butterfly 6 is slightly chamfered. The membrane 15 then has the shape of a ring with, in its central region, a V shaped bend 27.

The face of the annular element situated on the side opposite chamfer 26 is then welded to the inner edge 28 of membrane 15, on the side where the bend 27 extends.

As mentioned above, the outer flat edge 17 of membrane 15 is intended to be held clamped against the steep side 4 of the shoulder 3 of the bore by the wing 21 of collar 19 so as to provide static sealing.

In this example, this compression is provided by means of a resilient O-seal 29 partially housed in a groove 30 provided in the peripheral edge portion of wing 21 of collar 19. Moreover, the compression of this seal 29 is limited by a slight projection 31 in the bore of body 1 against which wing 21 abuts at the end of clamping of collar 19.

The annular element 14 is held axially in position, on the side opposite the butterfly 6, by the radial outer face 32 of the wing 21 of collar 19 which consequently extends against the inner edge portion 28 of the membrane 15.

Of course, so as to allow the bend 27 of membrane 15 as well as the annular element 14 to pass, the steep side of the shoulder 3 of the bore comprises a step 33 defining an annular volume with the outer face 32 of wing 21.

In the example shown in FIG. 3, the annular sealing element 14 made from solid metal has a substantially Z shaped section, i.e. comprising an inner annular part 35 with substantially rectangular section, an outer annular part 36 also rectangular but of a smaller dimension, this outer annular part 36 being axially offset, on the side opposite the butterfly 6, and a conical part 37 connecting the outer annular part 35 to the inner annular part 36.

In this case, membrane 15 has, in its central region, a rib 38 orientated to the same side as butterfly 6 (and consequently to the same side as the bore shoulder 3). This membrane is welded by its inner edge portion 16, to the radial face 39 of the inner annular part 35 situated on the side opposite the outer annular part 36.

As mentioned above, the inner edge portion 17 (flat) of this membrane is intended to be held clamped against the steep side of the shoulder 3 of the bore by the wing 21 of collar 19. Such clamping is also provided through a resilient O-seal 29.

In this case, to allow passage of the assembly formed by the annular element 14 and the membrane the outer face of wing 21 of collar 19 has a stepped profile, defining with the steep side of the bore shoulder an annular volume in which said assembly is housed. In addition, for allowing passage of the rib 38 provided in the central part of the membrane, the steep side comprises in its central region a circular axially orientated concavity 41.

This embodiment has the advantage of conferring on the inner annular part 35 of the annular element 14 which provides dynamic sealing with the butterfly 6, a mobility in the radial direction due to the resilient deformation of the membrane (because of rib 38) and mobility in the axial direction by deformation of the conical part 37 providing the connection between the outer 36 and inner 35 annular parts of the annular element.

To this end, the outer annular part 36 of the annular element 14 is retained axially by the radial face 43 of the wing 21 of collar 19, whereas it may move radially.

In the example shown in FIG. 4, the annular sealing element comprises a solid metal ring 46 whereas the membrane 15 has a section in the shape of a question mark comprising on the inner side a curved part 16 envelopping the ring 46, on the outer side a flat radial part 17 applied against the steep side 4 of the bore shoulder 3, these two parts 16, 17 being connected together by a conical connection zone 47. In this case also clamping of the flat part 17 is provided by means of collar 19, through a resilient O-seal 29 whose crushing is limited by a slight bore projection 49 in body 1 against which the edge portion of wing 21 of collar 19 comes to bear.

The advantage of this solution is the possibility of easily and independently defining the nature of the materials forming the membrane 15 on the one hand and the solid ring 46 on the other so as to adapt them perfectly to their function (sealing for the membrane and mechanical for the reaction ring).

In addition, because of its simplicity and low implementation cost, it limits the machining operations on body 1 to a minimum.

Contrary to the preceding solutions, it comprises no circular cavity or step on the steep side of the bore shoulder 3. Furthermore, it requires no particular machining of the wing 21 of the collar except for a very slight step shown in FIG. 4, but which may be avoided if need be.

Figure 5:
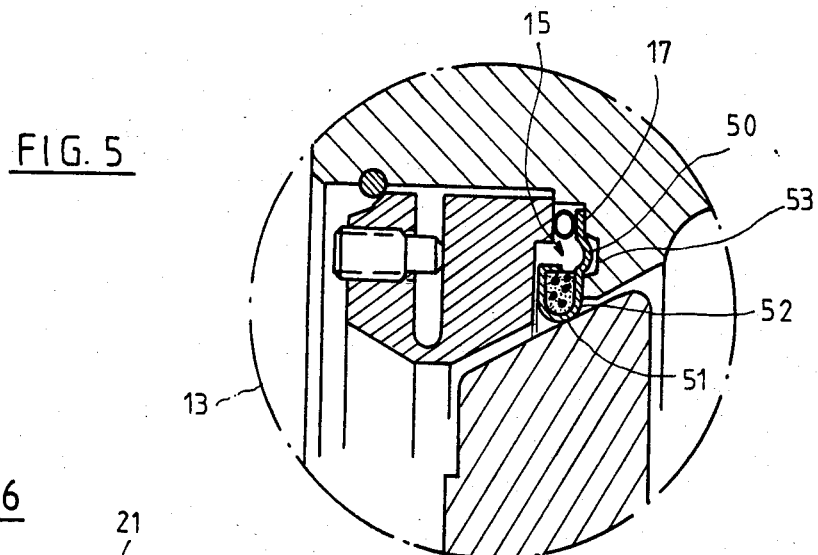
FIG. 5 shows a variant of the sealing device comprising an annular element made from a fibrous winding.

The sealing packing used in the sealing device shown in FIG. 5 comprises a membrane 15 whose outer flat part 17 is extended by a central part forming a curve 50 which is itself followed by a bent inner part 51 defining a substantially closed annular volume containing a ring made from a composite material 52 such for example as resin reinforced with long fibers of boron, glass, carbon, "Kevlar" or even metal. The fitting of this sealing packing is effected similarly to that described in connection with FIG. 4, except that it requires the provision of an annular cavity 53 orientated axially in the steep side of the bore shoulder 3 of body 1, for accomodating the curve 50 in the central part of membrane 15.

It should be noted in this connection that it would be possible to replace the solid metal ring 46 of the packing shown in FIG. 4 by a ring made from a composite material of the type shown in FIG. 5.

The solutions illustrated in FIGS. 4 and 5 are particularly remarkable by the simplicity of construction of the sealing packing and by the originality of their design conferring a great flexibility in use: the radial elasticity of rings 14 and 52 may in fact be readily adjusted depending on the applications by an appropriate choice of the nature of the material.

Figure 6:
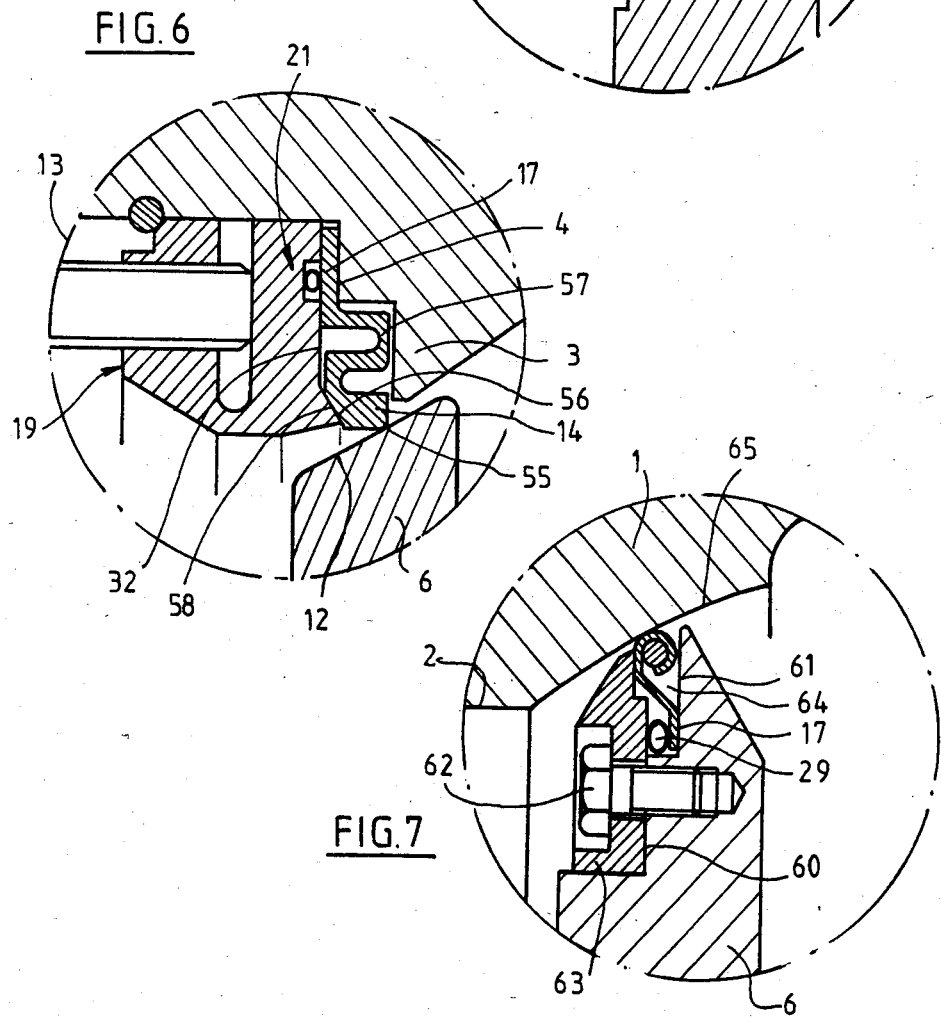
FIG. 6 shows another variant of the sealing device in which the sealing packing is formed by a single solid metal piece.

FIG. 6 shows a sealing device of this type shown in FIG. 2, but in which the sealing packing is formed from a single solid metal piece.

This sealing packing comprises more particularly:

an annular sealing element 14 substantially trapezoidal in section whose angular region 55 coming into contact with the edge 12 of butterfly 6 is slightly chamfered and which has, on the side opposite this part 55 a conical or possibly spherical face 56, a flat part 17 in the shape of a ring intended to be held clamped against the steep side 4 of the bore shoulder 3 of the body by the wing 21 of collar 19, for providing the static seal, and a U-shaped part 57 connecting the annular sealing element 14 to the flat part 17.

Moreover, the outer face 32 of wing 21 of collar 19 comprises a conical projection 58 against which the conical face 56 of the annular element 14 comes to bear. This arrangement is provided for promoting and guiding the self centering movements while holding the annular element 14 axially in position.

Of course, the invention is not limited to the above described arrangements. It relates more especially to the different combinations which obviously follow from these arrangements and, in particular, a reverse assembly in which the bore of the body comprises a substantially conical sealing surface and in which the sealing packing which may consist of any one of the previously described packings is mounted on the periphery of the valving member. In this case, this sealing packing provides, with the valving member, a static seal and with the sealing surface of the bore of the body a dynamic seal.

It is clear that from the above mentioned teaching, such a reverse assembly is obvious for a man skilled in the art.

Consequently, only a single examples of such an assembly which uses a sealing packing of the type shown in FIG. 4, will be described hereafter.

Figure 7:
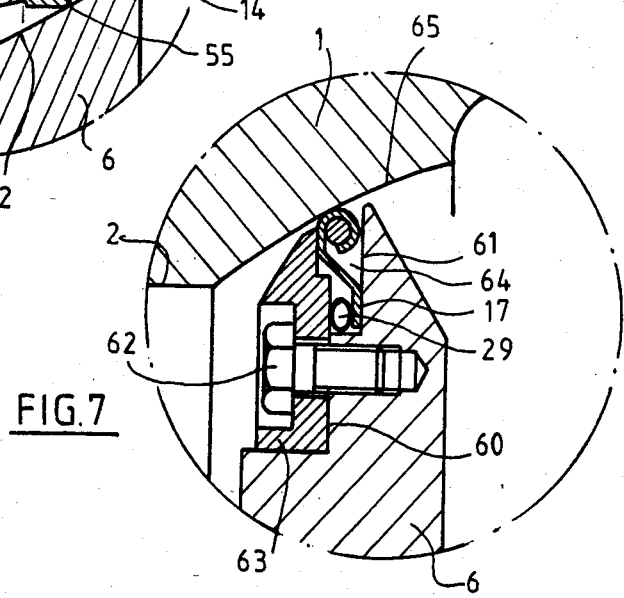
FIG. 7 shows another variant of the sealing device in which the sealing packing is carried by the butterfly of the valve.

As can be seen from FIG. 7, the peripheral edge portion of butterfly 6 has, in an axial plane, a stepped profile comprising two axially offset circular radial surfaces 60, 61. On the radial surface 60 is fixed, by means of screws 62, a collar 63 which defines with the radial surface 61 an annular volume 64 in which the packing is partially housed. The flat part 17 of this packing is applied against the radial surface 61 through a resilient O-seal 29 and thus provides static sealing with the butterfly 6.

The dynamic seal between body 1 and butterfly 6 is obtained by the action of the annular sealing element 14 on a substantially conical surface 65 provided in the bore 2 of body 1.

What is claimed is:

1. A sealing device for the upstream/downstream sealing of a valve of the type comprising:
    a tubular body comprising a bore having a shoulder with steep side,
    a valving member movable inside the bore of the body and comprising at its periphery a sealing surface of a conoid shape,
    a sealing packing on which comes to bear the sealing surface of the valve at the end of the valving stroke, said sealing packing comprising an annular dynamic sealing element having a low modulus of elasticity to traction along its circumference and an inner diameter substantially equal to the mean diameter of the sealing surface of the valving member and a coronal metal membrane comprising an inner edge portion sealingly connected to said annular element and an outer edge portion having a flat radial part applied against the steep side of the bore shoulder of the body so as to provide static sealing therewith, and
    a clamping device mounted inside said bore and adapted for axially clamping, in an homogeneous way, the flat part of the membrane so as to provide said static sealing, wherein said steep side forms with the clamping device an annular groove in which the annular element is radially guided and axially retained and the central part of said metal membrane is adapted so as to provide radial elasticity between said outer and inner edge portions and, consequently, radial mobility of said annular element.

2. The device as claimed in claim 1, wherein said annular element consists of a solid metal ring, with a section at least partially polygonal, coming to bearing directly on the sealing surface of said valving member and the inner edge portion of said membrane is welded directly to one face of said ring.

3. The device as claimed in claim 2, wherein the inner edge portion of said membrane is welded to said ring on the side opposite the zone where the sealing surface of the valving member comes to bear, the central part of said membrane comprises a bend extending on the same side as said ring, said clamping device comprises a collar having at least one radial face comprising a part ensuring clamping of the outer edge portion of the membrane against the steep side of the bore shoulder of the body and a part holding the ring axially in position on the side opposite said valving member and the steep side of the bore shoulder comprises a step defining with the radial face of said collar an annular volume in which said bend and possibly, partially said ring are housed.

4. The device as claimed in claim 3, wherein the compression of the flat outer edge portion of the membrane is provided by means of a resilient O-seal partially housed in a groove provided in the outer edge portion of said radial face of the collar and the compression of said resilient O-seal is limited by a projection in the bore of the body against which the collar comes into abutment at the end of clamping.

5. The device as claimed in claim 1, further comprising an annular sealing element made from solid metal having a substantially Z shaped section and comprising an inner annular part with substantially rectangular section, an annular external part axially offset with respect to the annular inner part on the side opposite the valving member and a substantially conical connecting part connecting the outer annular part to the inner annular part, and said membrane is welded by its inner edge portion to a radial face of the inner annular part of the annular sealing element, situated on the side opposite said external part.

6. The device as claimed in claim 5, wherein said clamping device comprises a collar having a stepped profile with a first radial face ensuring clamping of the outer edge portion of the membane against the steep side of the bore shoulder of the body, a second radial face defining with the steep side of the bore shoulder an annular volume in which said annular sealing element is partially housed, said second radial face serving for axially retaining the outer annular part of said annular sealing element, and a bearing surface on which said outer annular part comes to bear at the end of the radial stroke of said annular sealing element.

7. The device as claimed in claim 5, wherein the central part of said membrane comprises a rib and the steep side comprises, in its central region, a circular concavity orientated axially for housing said rib.

8. The device as claimed in claim 1, wherein said annular sealing element comprises a solid metal ring with substantially circular section and the inner edge portion of said membrane is adapted so as to surround said ring at least partially.

9. The device as claimed in claim 8, wherein said membrane has a section in the shape of a question mark and comprises, on the inner side, a curved part enveloping the ring, on the outer side a flat radial part coming into engagement against the steep side of the bore shoulder of the body and a conical connection zone connecting said two parts together.

10. The device as claimed in claim 9, wherein the flat radial part of said membrane is clamped against the steep side by means of a resilient O-seal on which comes to bear a radial face of a collar mounted in said body.

11. The device as claimed in claim 1, wherein said sealing packing is formed from a single solid metal piece.

12. The device as claimed in claim 11, wherein said sealing packing comprises:
    an annular sealing element with substantially trapezoidal section whose angular region coming into contact with the edge of the butterfly is slightly chamfered and which has, on the side opposite this part, a conical or possibly spherical face,
    a flat part in the shape of a ring intended to be held clamped against the steep side of the bore shoulder of the body by the wing of the collar, for providing static sealing, and a U shaped part connecting the annular sealing element to said flat part, and said clamping device comprises a conical projection on which comes to bear the conical face of said annular element.

13. The device as claimed in claim 1, wherein said annular sealing element is formed by a ring made from a composite material disposed in an annular volume formed by a bent back portion of the inner edge portion of said membrane.

14. The device as claimed in claim 13, wherein said ring is made form resin reinforced with long fibers made from a material such as carbon, glass, metal or "Kevlar".

15. The device as claimed in claim 1, wherein in a reverse assembly, the bore of the body of the valve comprises a substantially conical sealing surface and the packing is mounted on the periphery of the valving member so as to form, with the valving member, a static seal and, with said sealing surface, a dynamic seal.

* * * * *